(12) United States Patent  (10) Patent No.: US 7,082,687 B2
Wang  (45) Date of Patent: Aug. 1, 2006

(54) HEIGHT-ADJUSTABLE GRASS SCISSORS

(76) Inventor: Ya Hsin Wang, No. 198, Wunsin 1st Rd., Nantun District, Taichung City 408 (TW)

( * ) Notice: Subject to any disclaimer, the term of this patent is extended or adjusted under 35 U.S.C. 154(b) by 94 days.

(21) Appl. No.: 10/978,579

(22) Filed: Nov. 2, 2004

(65) Prior Publication Data

US 2006/0090349 A1  May 4, 2006

(51) Int. Cl.
*B26B 13/22* (2006.01)
(52) U.S. Cl. .............................. 30/248; 30/123; 30/271
(58) Field of Classification Search .................. 30/248, 30/250, 123, 331, 270, 375, 376, 377
See application file for complete search history.

(56) References Cited

U.S. PATENT DOCUMENTS 3,039,190 A * 6/1962 Wallace ........................ 30/248
3,375,581 A * 4/1968 Knight ........................ 30/248
3,496,710 A * 2/1970 Hedu et al. .................... 56/241
4,739,556 A * 4/1988 Orthey ........................ 30/248
6,308,423 B1 * 10/2001 Ono ............................ 30/377

* cited by examiner

*Primary Examiner*—Charles Goodman
(74) *Attorney, Agent, or Firm*—Rosenberg, Klein & Lee

(57) ABSTRACT

A height-adjustable grass scissors including a main body and a pair of blades disposed at front end of the main body. A fixed handle extends from rear end of the main body. A movable handle is pivotally disposed at rear end of the main body and drivingly connected with the blades. By means of pressing the movable handle, the blades are drivable to scissor grasses. An adjustment unit is vertically linearly movably mounted in a bottom of the main body. A bottom of the adjustment unit has a rest face for resting against the ground, whereby a distance between the blades and the ground is changeable.

3 Claims, 5 Drawing Sheets

HEIGHT-ADJUSTABLE GRASS SCISSORS

BACKGROUND OF THE INVENTION

The present invention is related to a grass-scissoring measure, and more particularly to a height-adjustable grass scissors.

The existent manual grass scissors can be substantially divided into handheld type and long-arm type. The handheld type grass scissors has simple and lightweight structure and can be operated with single hand. The long-arm type grass scissors has an elongated arm assembly for a user to scissor the grasses in standing attitude. The bottom end of the arm assembly has a shaft connector for pivotally connecting the arms by a specific angle. A user can operate the grass scissors to scissor the grasses without bowing. In comparison with the handheld grass scissors, the long-arm type grass scissors has a more complicated structure and heavier weight.

In order to facilitate operation of the long-arm type grass scissors, an auxiliary handle is disposed at the middle of the arms of the long-arm type grass scissors. In addition, the bottom of the long-arm type grass scissors is equipped with wheels, whereby a user can push the long-arm type grass scissors to scissor grasses. The height of the wheels is just the fixed height of the lawn after scissored. Taiwanese Utility Patent Publication No. 416266 discloses a long-arm type grass scissors which pertains to the above long-arm type grass scissors.

FIG. 5 shows a pair of handheld grass scissors having a main body 81 and a pair of blades 82 disposed at front end of the main body 81. A fixing handle 83 extends from rear end of the main body 81. A movable handle 84 is pivotally disposed at rear end of the main body 81 and drivingly connected with the blades 82. By means of pressing the movable handle 84, the blades 82 are driven to scissor grasses.

The handheld grass scissors can be easily operated. However, the scissoring grasses, a user needs to hold the scissors and keep his/her arm suspended in the air at a certain height so as to scissor the grasses tidily. This is quite inconvenient to the user. The wheel structure of the long-arm type grass scissors is not applicable to the handheld grass scissors and the height of the lawn is not adjustable.

SUMMARY OF THE INVENTION

It is therefore a primary object of the present invention to provide a height-adjustable grass scissors. An adjustment unit is vertically linearly movably mounted in a bottom of the main body. A bottom of the adjustment unit has a rest face for resting against the ground, whereby a distance between the blades and the ground is changeable. Accordingly, the height of the lawn is adjustable.

According to the above object, the height-adjustable grass scissors of the present invention includes a main body and a pair of blades disposed at front end of the main body. A fixed handle extends from rear end of the main body. A movable handle is pivotally disposed at rear end of the main body and drivingly connected with the blades. By means of pressing the movable handle, the blades are drivable to scissor grasses. An adjustment unit is vertically linearly movably mounted in a bottom of the main body. A bottom of the adjustment unit has a rest face for resting against the ground, whereby a distance between the blades and the ground is changeable.

The present invention can be best understood through the following description and accompanying drawings wherein:

DETAILED DESCRIPTION OF THE PREFERRED EMBODIMENT

Figure 1:
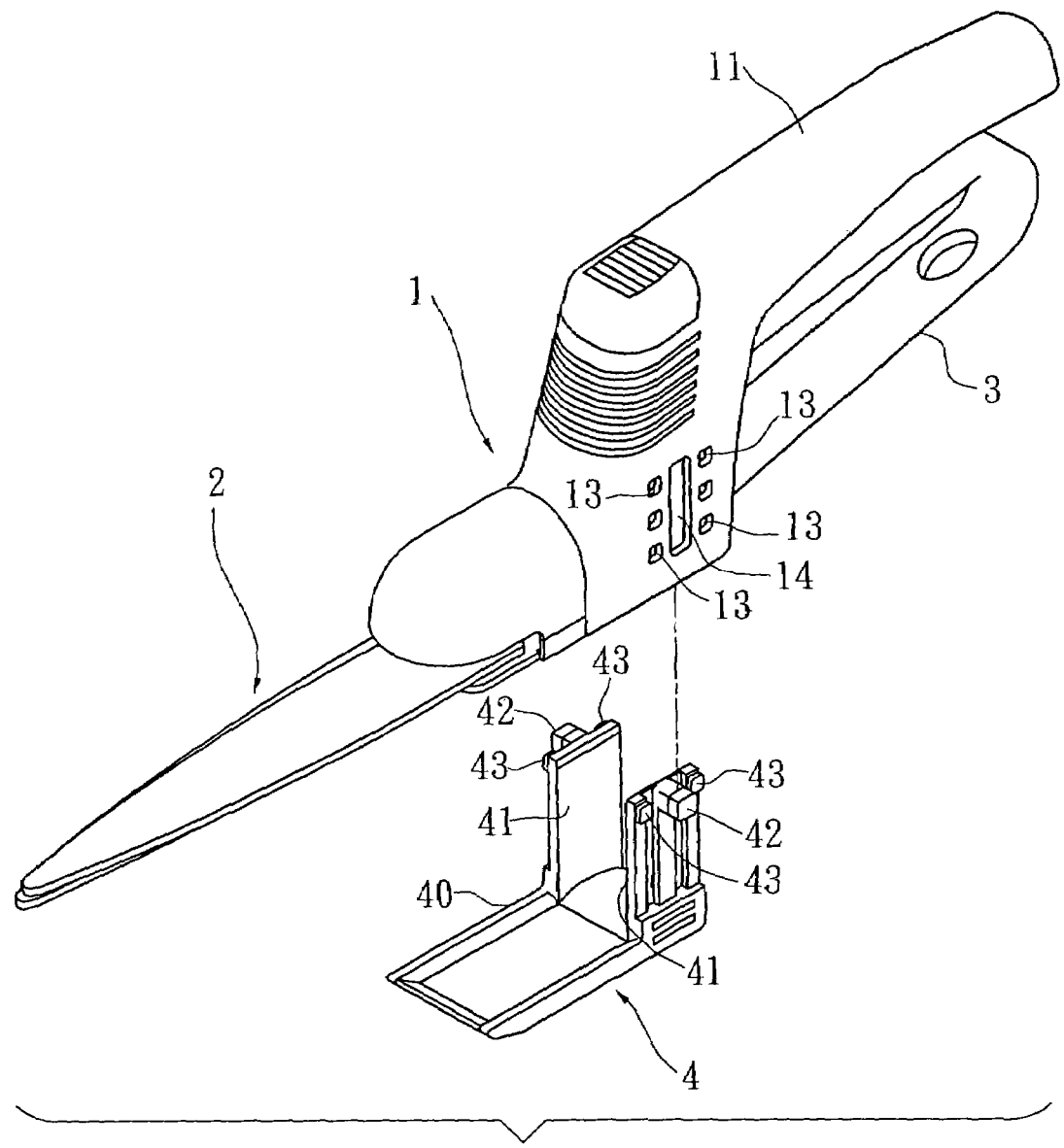
FIG. 1 is a perspective exploded view of the present invention.
Figure 2:
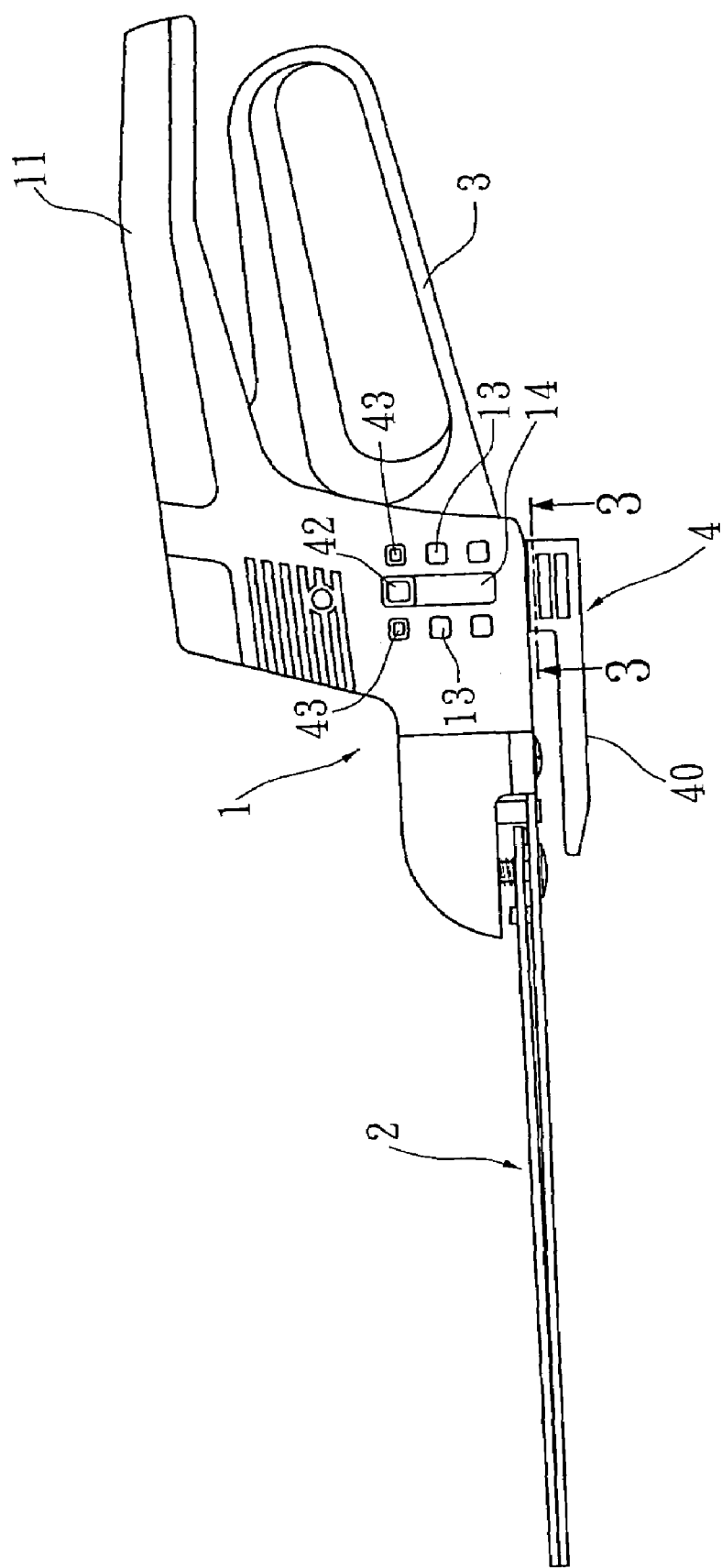
FIG. 2 is a side plane view of the present invention.
Figure 3:
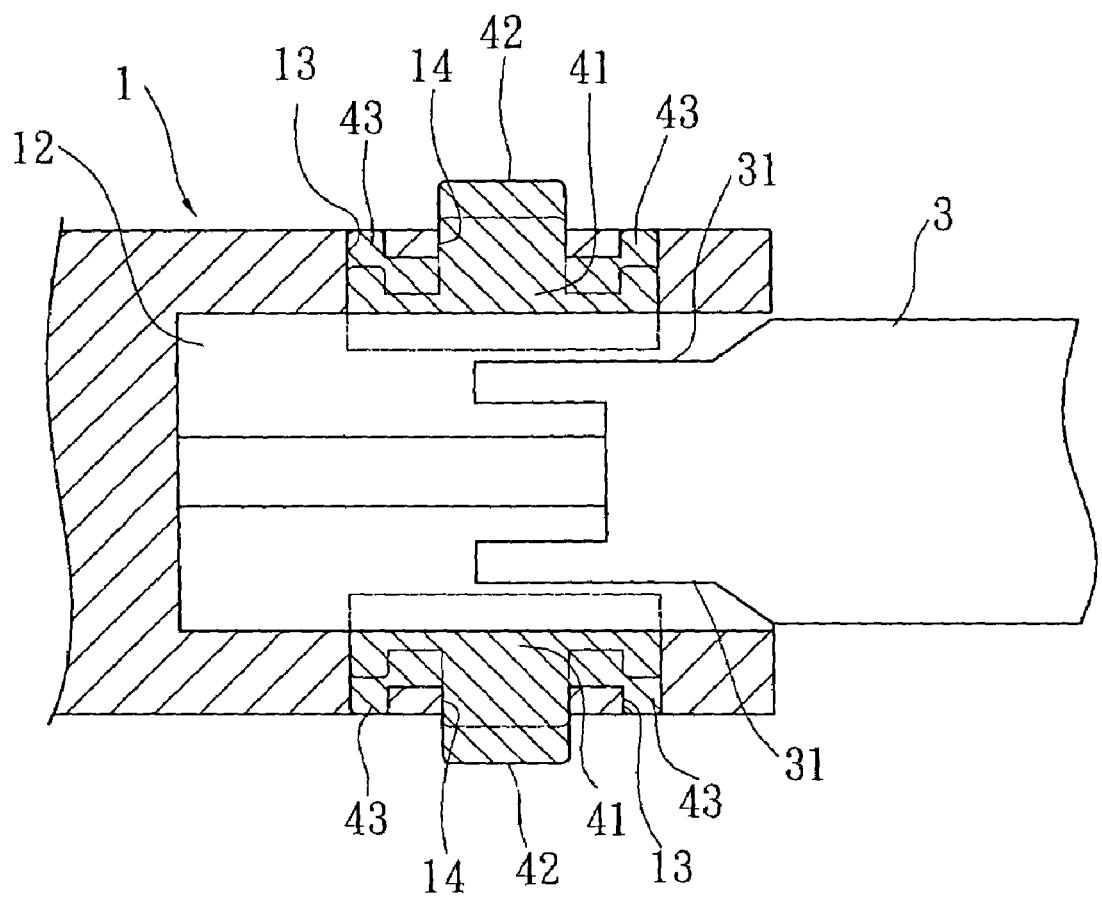
FIG. 3 is a sectional view taken along line 3—3 of FIG. 2.

Please refer to FIGS. 1 to 3. The grass scissors of the present invention includes a main body 1 and a pair of blades 2 disposed at front end of the main body 1. A fixed handle 11 extends from rear end of the main body 1. A movable handle 3 is pivotally disposed at rear end of the main body 1 and drivingly connected with the blades 2. By means of pressing the movable handle 3, the blades 2 are driven to scissor grasses.

The bottom of the main body 1 is formed with an opening 12 in which an adjustment unit 4 is vertically linearly movably mounted. The bottom of the adjustment unit 4 has a rest face 40 for resting against the ground. Two sideboards 41 respectively upward extend from two sides of the adjustment unit 4. Each sideboard 41 has a press section 42 and two projecting blocks 43. The main body is formed with several longitudinally arranged locating holes 13 at intervals corresponding to the projecting blocks 43 of the sideboards 41. The projecting blocks 43 can be selectively inserted and located in the locating holes 13 to change the height of the blades 2 from the rest face 40. The main body 1 is further formed with a slot 14 corresponding to each press section 42. The press section 14 outward protrudes through the slot 14 from the main body 1 for a user to operate.

The movable handle 3 is formed with two recesses 31 corresponding to the two sideboards 41 of the adjustment unit 4. The recesses 31 serve as two displacement spaces, whereby only when the movable handle 3 is pressed to the bottom, the press sections 42 of the sideboards 41 of the adjustment unit 4 can be pressed to detach the projecting blocks 43 out of the locating holes 13 for adjusting the height.

Figure 4:
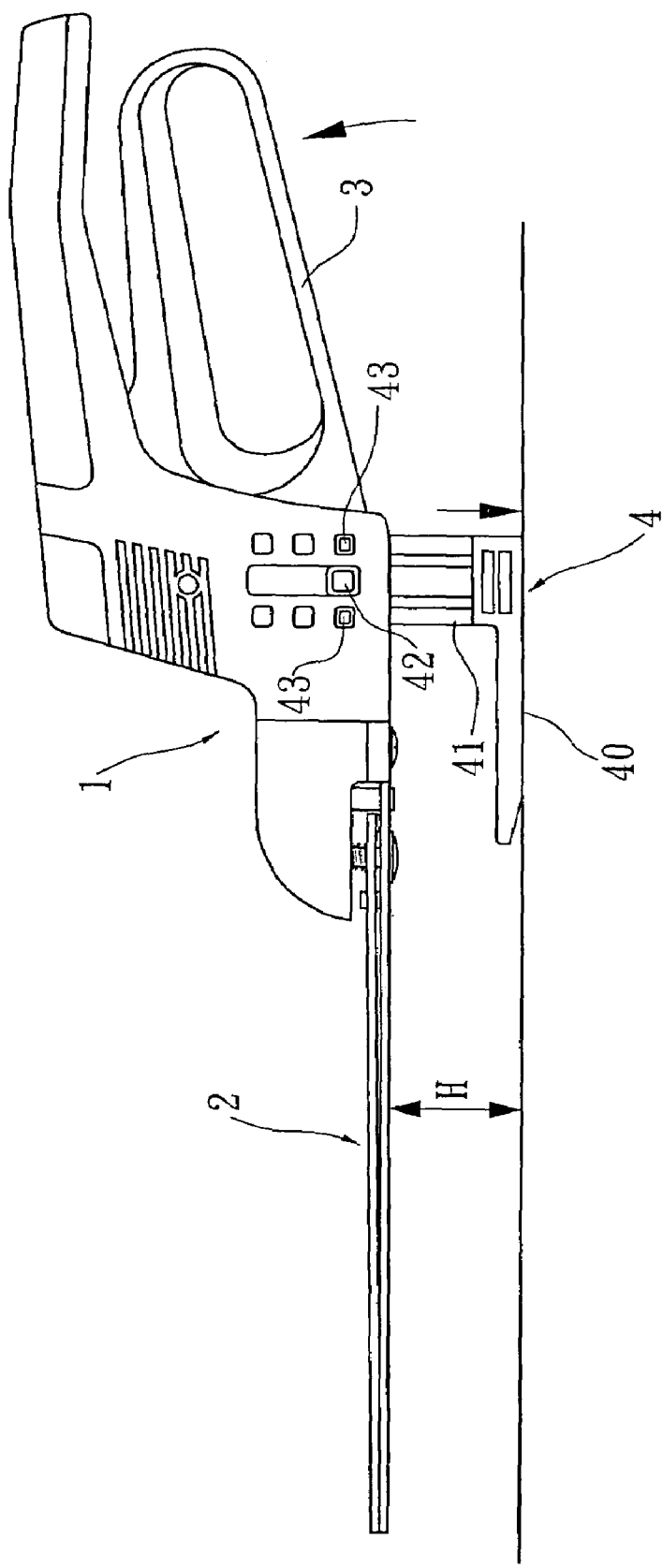
FIG. 4 is a side plane view of the present invention, showing the use thereof.
Figure 5:
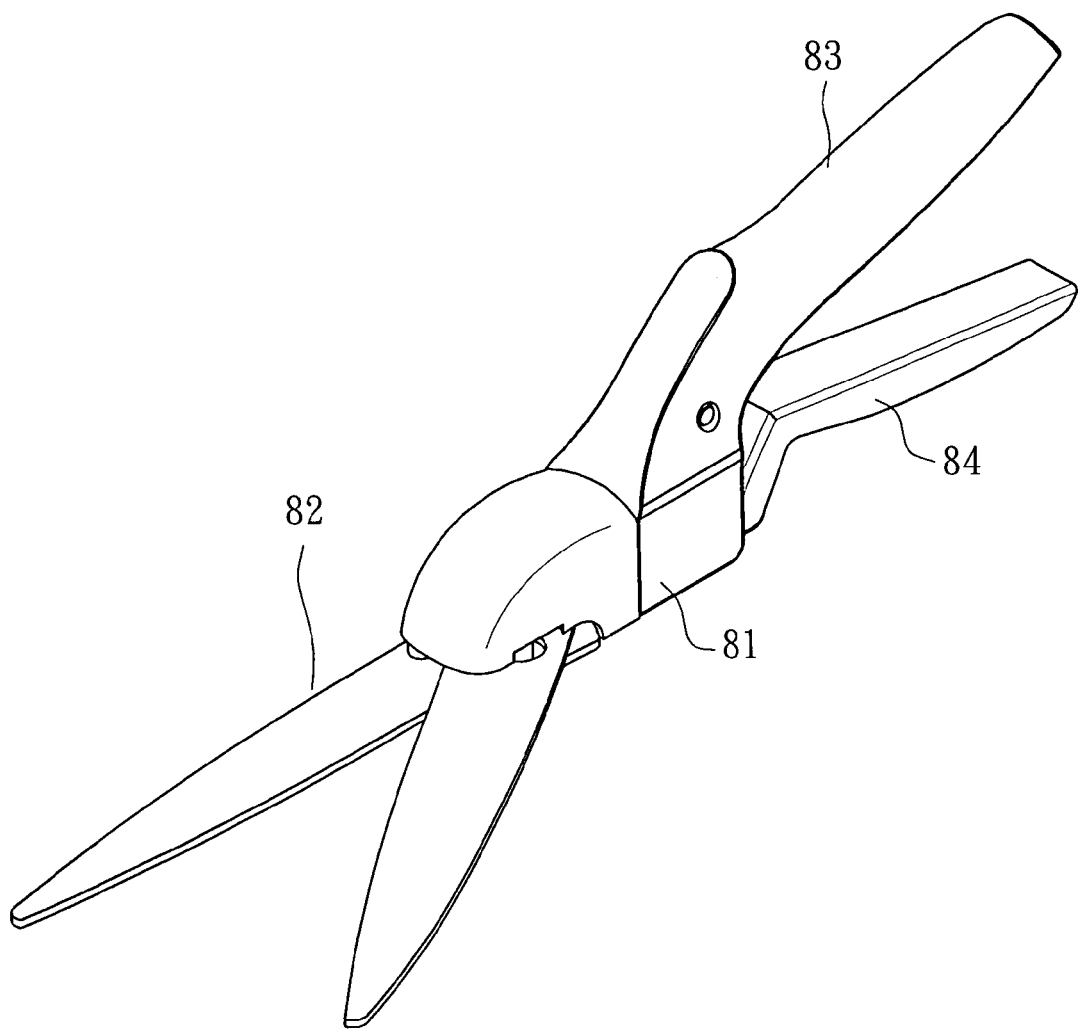
FIG. 5 is a perspective view of a pair of conventional grass scissors.

When scissoring the grasses, a user first presses the movable handle 3 to the bottom to align the recesses 31 of the movable handle 3 with the sideboards 41 of the adjustment unit 4. Then the user presses both the press sections 42 of the sideboards 41 with the other hand to inward displace the sideboards 41. At this time, the projecting blocks 43 of the sideboards 41 are detached out of the locating holes 13 of the main body 1. Under such circumstance, the adjustment unit 4 can be pulled downward. Then the press sections 42 are released to restore the sideboards 41 to their home positions. At this time, the projecting blocks 43 of the sideboards 41 are inserted and located in the locating holes 13 of the main body 1 as shown in FIG. 4. Accordingly, a height H is defined between the rest face 40 of the adjustment unit 4 and the blades 2. The height of the lawn after scissored is determined by the height H.

Moreover, the main body 1 is formed with multiple longitudinally arranged locating holes 13 at intervals. Therefore, the height H between the rest face 40 of the adjustment unit 4 and the blades 2 can be multistage adjusted as necessary to facilitate use of the grass scissors.

The above embodiment is only used to illustrate the present invention, not intended to limit the scope thereof. Many modifications of the above embodiment can be made without departing from the spirit of the present invention.

What is claimed is:

1. A height-adjustable grass scissors comprising a main body and a pair of blades disposed at front end of the main body, a fixed handle extending from rear end of the main body, a movable handle being pivotally disposed at rear end of the main body and drivingly connected with the blades, by means of pressing the movable handle, the blades being drivable to scissor grasses, said grass scissors being characterized in that an adjustment unit is vertically linearly movably mounted in a bottom of the main body, a bottom of the adjustment unit having a rest face for resting against the ground, whereby a distance between the blades and the ground is changeable.

2. The height-adjustable grass scissors as claimed in claim 1, wherein a bottom of the main body is formed with an opening in which the adjustment unit is vertically linearly movably mounted, two sideboards respectively upward extending from two sides of the adjustment unit, each sideboard having a press section and more than one projecting block, the main body being formed with several longitudinally arranged locating holes at intervals corresponding to the projecting blocks of the sideboards, whereby the projecting blocks can be selectively inserted and located in the locating holes to change the height of the blades from the rest face, the main body being further formed with a slot corresponding to each press section, whereby he press section outward protrudes through the slot from the main body for a user to operate.

3. The height-adjustable grass scissors as claimed in claim 2, wherein the movable handle is formed with two recesses corresponding to the two sideboards of the adjustment unit, the recesses serving as two displacement spaces, whereby only when the movable handle is pressed to the bottom, the press sections of the sideboards of the adjustment unit can be pressed to detach the projecting blocks out of the locating holes for adjusting the height.

\* \* \* \* \*